(12) United States Patent
Gonia et al.

(10) Patent No.: US 7,930,115 B2
(45) Date of Patent: Apr. 19, 2011

(54) LOW-POWER FLOW METER AND RELATED METHOD

(75) Inventors: Patrick S. Gonia, Maplewood, MN (US); Chunbo Zhang, Plymouth, MN (US)

(73) Assignee: Honeywell International Inc., Morristown, NJ (US)

( * ) Notice: Subject to any disclaimer, the term of this patent is extended or adjusted under 35 U.S.C. 154(b) by 150 days.

(21) Appl. No.: 12/251,732

(22) Filed: Oct. 15, 2008

(65) Prior Publication Data

US 2010/0094570 A1 Apr. 15, 2010

(51) Int. Cl.
*G01F 1/00* (2006.01)
*G01F 1/84* (2006.01)

(52) U.S. Cl. .................... 702/50; 73/861.355
(58) Field of Classification Search .............. 702/49, 702/50, 54; 73/861.354, 861.355, 861.356, 73/861.357
See application file for complete search history.

(56) References Cited

U.S. PATENT DOCUMENTS

| | | | |
|---|---|---|---|
| 5,798,835 A * | 8/1998 | Kotidis et al. | 356/502 |
| 6,526,839 B1 * | 3/2003 | Barger et al. | 73/861.356 |
| 6,722,209 B1 | 4/2004 | Fan et al. | |
| 6,748,813 B1 * | 6/2004 | Barger et al. | 73/861.355 |
| 2005/0284815 A1 | 12/2005 | Sparks et al. | |

FOREIGN PATENT DOCUMENTS

| | | |
|---|---|---|
| GB | 2 221 302 A | 1/1990 |
| WO | WO 00/34748 A2 | 6/2000 |

OTHER PUBLICATIONS

"Mass flow meter", www.wikipedia.org, Jul. 15, 2008, 4 pages.
"Mach-Zehnder interferometer", www.wikipedia.org, Sep. 5, 2008, 4 pages.
"Coriolis Flowmeter", 2008 eFunda, www.efunda.com, 5 pages.
European Search Report dated Mar. 8, 2010 in connection with European Patent Application No. 09 17 2600.
Wade C.A., et al., "Fibre-optics coriolis mass flowmeter for liquids", Electronics Letters, vol. 24, No. 13, Jun. 23, 1988, p. 783-785.
Dr. Rudiger Paschotta, "Encyclopedia of Laser Physics and Technology", Mar. 20, 2008, p. 1-5.
"Flow Operating Principle", www.emersonprocess.com, 18 pages, date unknown (likely on or before Mar. 11, 2007).

* cited by examiner

*Primary Examiner* — Bryan Bui
(74) *Attorney, Agent, or Firm* — Munck Carter, LLP

(57) ABSTRACT

A method includes creating Coriolis-based deflection in at least one oscillating flow tube of a flow meter, which is caused by material flowing through the at least one flow tube. The method also includes determining a deflection amplitude and deflection period using interferometric measurements. The method further includes determining a characteristic of the material using the amplitude and period and transmitting the characteristic. A laser interferometer could include a photo-detector. The deflection period could be based on variations in a period of fringes in the photo-detector's output. The deflection amplitude could be based on a number of fringes during the deflection period. A resonant frequency of the at least one flow tube can be determined using the deflection period, and a density of the material can be determined using the resonant frequency. The characteristic of the material could include a mass flow rate or a volumetric flow rate of the material.

21 Claims, 8 Drawing Sheets

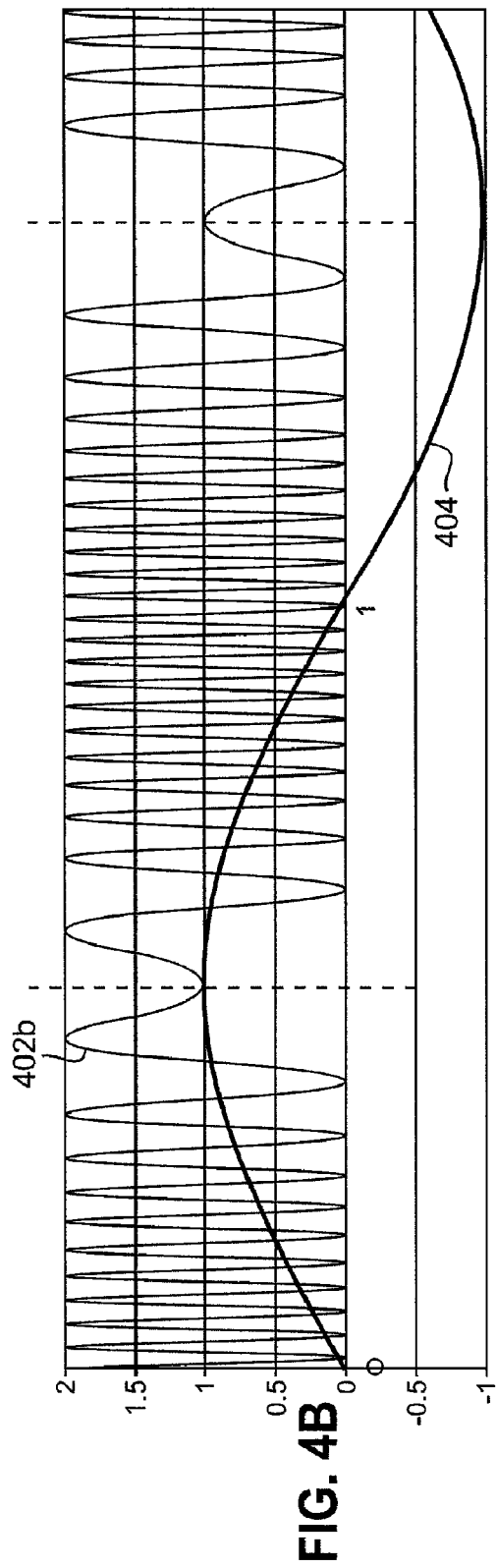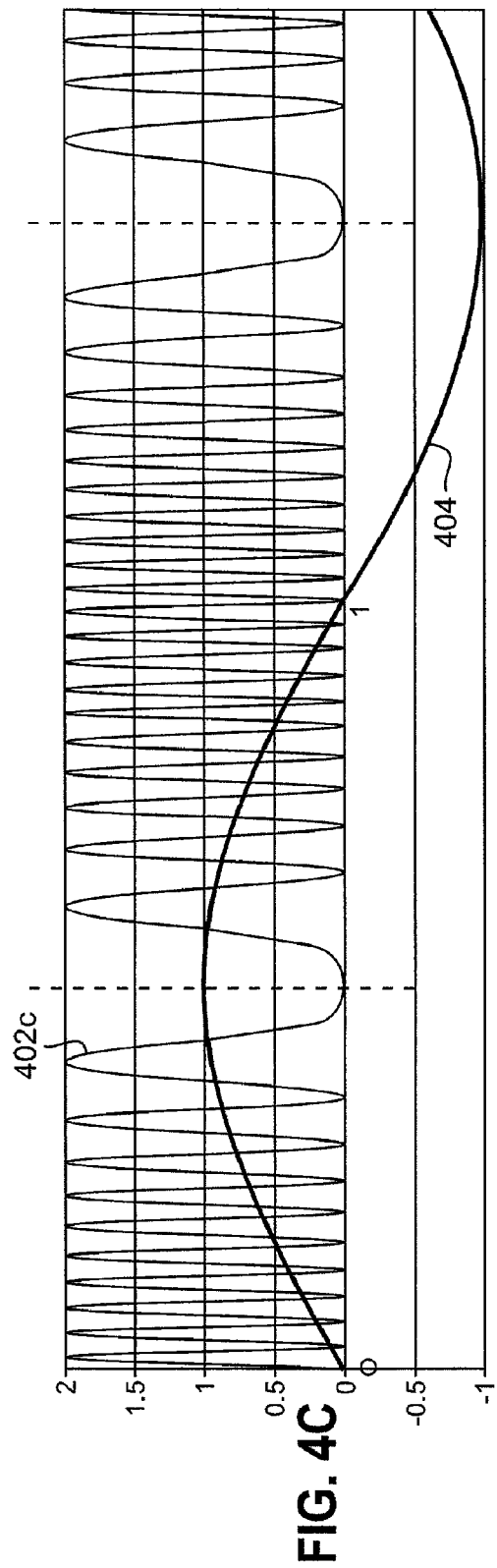

LOW-POWER FLOW METER AND RELATED METHOD

TECHNICAL FIELD

This disclosure relates generally to flow meters and more specifically to a low-power flow meter and related method.

BACKGROUND

Many industrial plants and other facilities use flow meters to measure amounts of material flowing through pipes and other structures. Typical flow meters, such as Coriolis-based flow meters, consume significant amounts of power. As a result, a typical flow meter either (i) is physically wired to an external power source or (ii) requires frequent replacement of an internal power source. Typical flow meters also transmit measurement information over communication wiring. Physically wiring a flow meter to an external power source or to an information receiver increases an installation cost of the meter, while frequent replacement of an internal power source increases a maintenance cost of the meter.

SUMMARY

This disclosure provides a low-power flow meter and related method, such as a flow meter suitable for wireless applications.

In a first embodiment, a method includes creating Coriolis-based deflection in at least one oscillating flow tube of a flow meter. The Coriolis-based deflection is caused by material flowing through the at least one flow tube. The method also includes determining an amplitude and a period of the deflection using interferometric measurements of the at least one flow tube. The method further includes determining a characteristic of the material using the amplitude and the period of the deflection and transmitting the characteristic from the flow meter.

In particular embodiments, the method also includes taking the interferometric measurements using a Mach-Zender laser interferometer. The laser interferometer includes multiple arms, and the deflection affects paths of the arms of the laser interferometer.

In other particular embodiments, two flow tubes are symmetrical to each other. Also, the flow tubes are excited into oscillations in opposite directions to create the Coriolis-based deflection. In addition, the method further includes rejecting at least some common-mode noise caused by environmental vibrations of the flow meter using the laser interferometer.

In yet other particular embodiments, the laser interferometer includes a photo-detector. Determining the period of the deflection includes identifying one period of the deflection based on variations in a period of fringes in an output of the photo-detector. Determining the amplitude of the deflection includes determining a number of fringes in the output of the photo-detector during the one period of the deflection.

In still other particular embodiments, determining the characteristic includes determining a mass or volumetric flow rate of the material.

In other particular embodiments, the method also includes placing the flow meter in a reduced power sleep state between two determinations of the characteristic. Creating the Coriolis-based deflection could include applying an excitation signal to an actuator when the flow meter exits the reduced power sleep state to incite the at least one flow tube into oscillation.

In additional particular embodiments, the characteristic can be transmitted wirelessly, and the flow meter can be powered with a local power source.

In a second embodiment, an apparatus includes a laser interferometer configured to generate and output interferometric measurements associated with at least one oscillating flow tube. The at least one flow tube is configured to receive flowing material that creates Coriolis-based deflection in the at least one flow tube. The apparatus also includes a processing unit configured to determine an amplitude and a period of the deflection using the interferometric measurements and to determine a characteristic of the material using the amplitude and the period of the deflection.

In particular embodiments, one or multiple laser interferometer could be used.

In a third embodiment, a computer readable medium embodies a computer program. The computer program includes computer readable program code for receiving interferometric measurements associated with at least one oscillating flow tube of a flow meter. The at least one flow tube is configured to undergo Coriolis-based deflection caused by material flowing through the at least one flow tube. The computer program also includes computer readable program code for determining an amplitude and a period of the deflection using the interferometric measurements. The computer program further includes computer readable program code for determining a characteristic of the material using the amplitude and the period of the deflection. In addition, the computer program includes computer readable program code for outputting the characteristic.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 4A through 4D illustrate example signals produced by a flow meter in accordance with this disclosure;

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

FIGS. 1A through 1D illustrate general operation of a portion of a Coriolis flow meter 100. The portion of the flow meter 100 shown in FIGS. 1A through 1D is for illustration only. Other embodiments of the flow meter 100 could be used without departing from the scope of this disclosure.

Figure 1A:
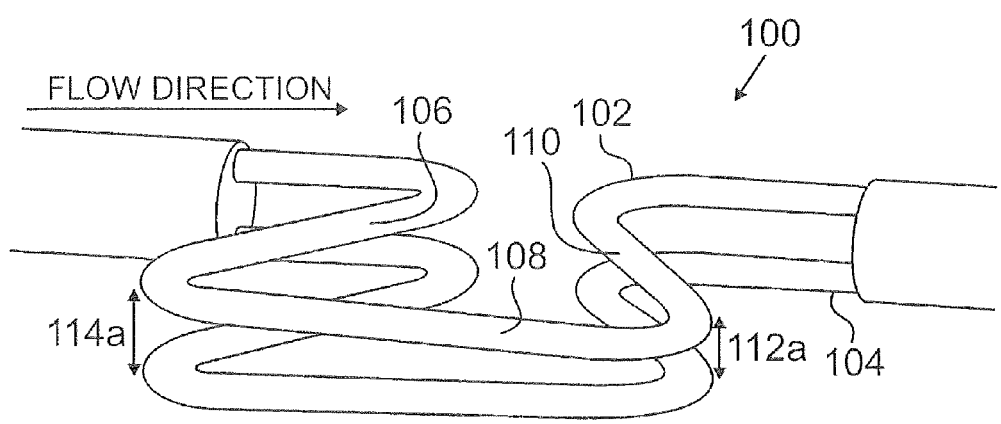
FIGS. 1A through 1D illustrate general operation of a portion of a Coriolis flow meter.

As shown in FIG. 1A, the flow meter 100 includes two flow tubes 102-104. One or more materials flow through the meter 100 by traveling through at least one of the flow tubes 102-104. Each of the flow tubes 102-104 includes any suitable structure through which material being measured can flow. Each of the flow tubes 102-104 could also have any suitable shape. In this example, each of the flow tubes 102-104 includes an inlet arm 106, a connecting arm 108, and an outlet arm 110. Material flowing through a flow tube in the flow meter 100 travels through the inlet arm 106, then through the connecting arm 108, and finally through the outlet arm 110.

In one aspect of operation, an actuator (not shown) creates an external excitation in the flow tubes 102-104 of the flow meter 100. This excitation produces a resonance in the flow tubes 102-104 and leads to oscillating movement of the flow tubes 102-104. This oscillating movement generally results in up and down movement of the flow tubes 102-104 (in the orientation shown in FIGS. 1A through 1D). Also, the oscillating movement of one flow tube may be counter to the oscillating movement of the other flow tube. In other words, when the flow tube 102 moves up, the flow tube 104 moves down, creating a wider opening between the flow tubes 102-104. Similarly, when the flow tube 102 moves down, the flow tube 104 moves up, creating a narrower opening between the flow tubes 102-104.

When no material is moving through the flow tubes 102-104, the oscillating movements of the flow tubes 102-104 are symmetrical. This means that the distances between the flow tubes 102-104 at both ends of the connecting arms 108 are generally uniform or equal. Also, these distances remain generally uniform or equal as the flow tubes 102-104 oscillate.

When material is moving through the flow tubes 102-104, the curved paths of the flow tubes 102-104 affect the angular momentum of the material. The arm of each flow tube through which fluid flows away from the axis of rotation (the inlet arm 106) exerts a force on the fluid to increase its angular momentum, so that arm bends backwards. The arm of each flow tube through which fluid is pushed back to the axis of rotation (the outlet arm 110) exerts a force on the fluid to decrease its angular momentum, so that arm bends forward. This produces a twisting motion or other deflection in each of the flow tubes 102-104 in addition to their oscillating movements. This deflection causes the distances between the flow tubes 102-104 at the ends of the connecting arms 108 to be unequal most of the time. The deflection is often referred to as the "Coriolis effect."

Figure 1B:
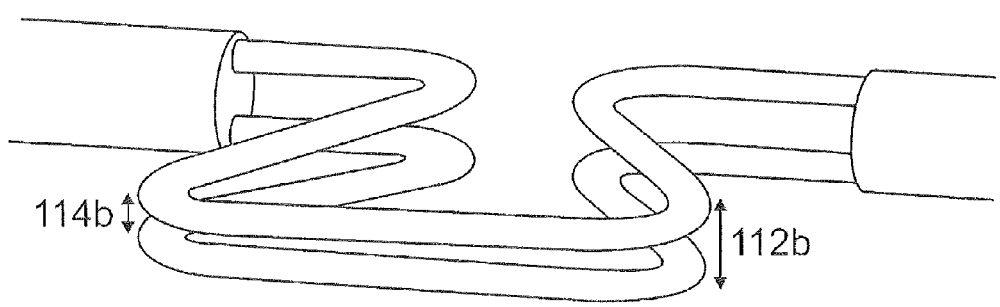
Figure 1C:
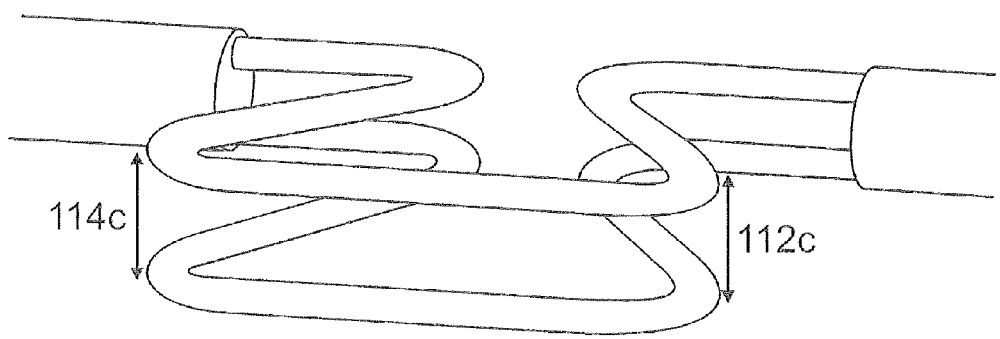

An example of this deflection is shown in FIGS. 1A through 1C. In FIG. 1A, the connecting arms 108 of the flow tubes 102-104 are separated by a distance 112a on the right and a distance 114a on the left. Here, the right ends of the connecting arms 108 started moving towards one another sooner than the left ends of the connecting arms 108.

Eventually, the right ends of the connecting arms 108 reach their minimal spacing and begin to separate, while the left ends of the connecting arms 108 are just reaching their minimal spacing. As shown in FIG. 1B, the right ends of the connecting arms 108 are currently separated at a distance 112b, while the left ends of the connecting arms 108 are separated at a distance of 114b.

After that, the right ends of the connecting arms 108 separate to their maximal spacing and begin approaching one another, while the left ends of the connecting arms 108 continue to separate from one another. As shown in FIG. 1C, the right ends of the connecting arms 108 are separated by a distance 112c, and the left ends of the connecting arms 108 are separated at distance 114c (which at this instance are approximately equal). As shown here, the right ends of the connecting arms 108 are the leading ends (in terms of time), and the left ends of the connecting arms 108 are the trailing ends (in terms of time). This means that the right ends of the connecting arms 108 are the first to move together or separate from one another, and the left ends follow that movement.

Figure 1D:
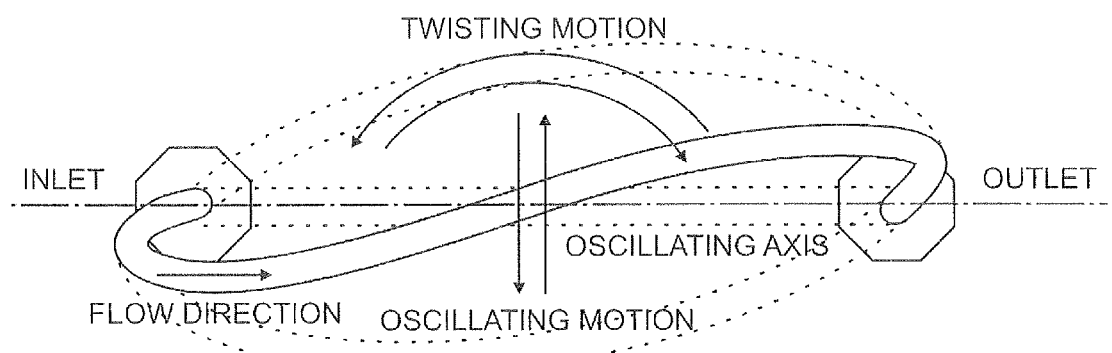

FIG. 1D illustrates both of these movements in one of the flow tubes (when material is flowing through the tube). As can be seen in FIG. 1D, the flow tube oscillates and twists. The oscillations involve up and down movement around an oscillating axis. The twists create asymmetrical movements of the flow tube, where the right and left sides of the flow tube move up and down but at different times. Again, the right side leads the left side here, meaning the left side of the flow tube follows the movements of the right side of the flow tube. Note that the amplitudes of the oscillation and twist are typically extremely small compared to the size of the flow tubes, and the oscillation and twist shown in these figures are highly exaggerated for illustrative purposes.

The deflection of the flow tubes 102-104 varies based on the mass of material flowing through the flow tubes 102-104. As a result, precise measurements of the movements of the flow tubes 102-104 can be used to determine the mass, volume, or other characteristic(s) of the material flowing through the flow meter 100. Traditional Coriolis flow meters use magnetic coils to excite and measure tube vibrations and deflection, which generally requires a relatively long or continuous excitation period and large vibration amplitudes. This causes the power consumption of traditional Coriolis flow meters to be relatively high.

As described in more detail below, a Coriolis flow meter can utilize one or more laser interferometers to reduce both the excitation period and the vibration amplitude of the flow tubes. For example, one or more laser interferometers can be used to measure the Coriolis-based deflection of the flow tubes 102-104. Even very small deflections of the flow tubes can be measured by the laser interferometer(s), reducing the amount of energy needed to excite the flow tubes to oscillate. Also, data from the laser interferometers can be analyzed to measure the Coriolis forces affecting the flow tubes 102-104. This allows the mass flow, volume flow, or other characteristic(s) of the material flowing through the flow tubes 102-104 to be determined. In addition, these operations can be performed using low-power components, such as a low-power laser and a low-power wireless radio, to provide a low-power flow meter. In fact, this could result in power reduction by several orders of magnitude compared to conventional Coriolis flow meters. Two examples of flow meters that operate in this manner are described in more detail below.

Although FIGS. 1A through 1D illustrate general operation of a portion of a Coriolis flow meter 100, various changes may be made to FIGS. 1A through 1D. For example, the flow tubes 102-104 could have any suitable shape, such as a perfect U-shape. Also, note that material could flow through only one of the flow tubes 102-104.

Figure 2A:
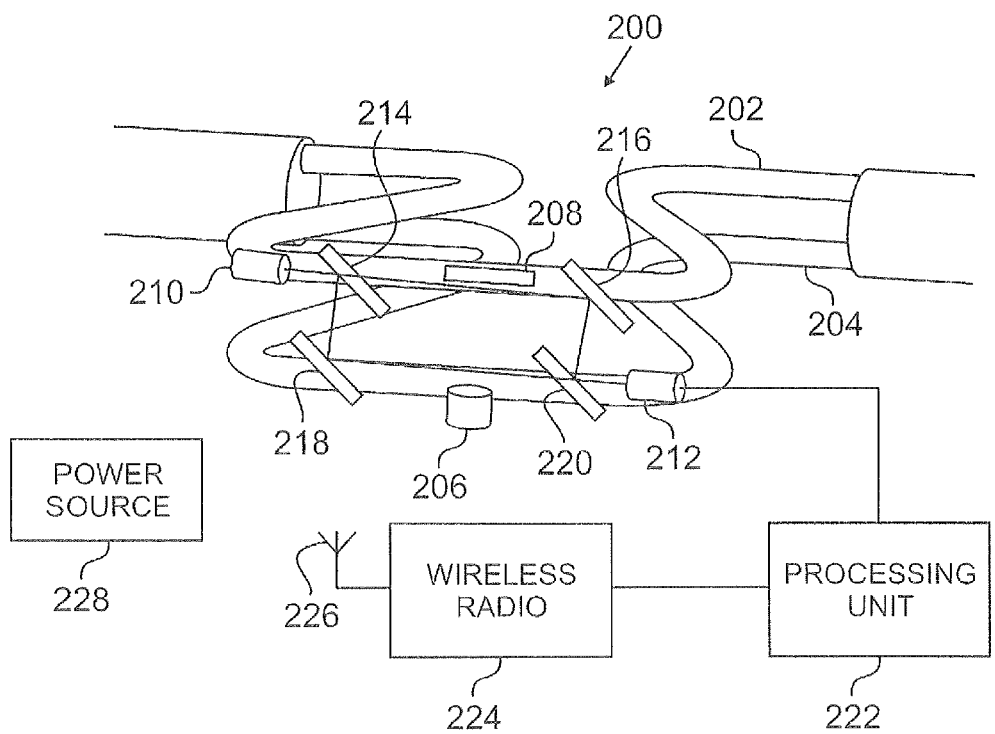
FIGS. 2A through 2C illustrate a first example flow meter in accordance with this disclosure.
Figure 2B:
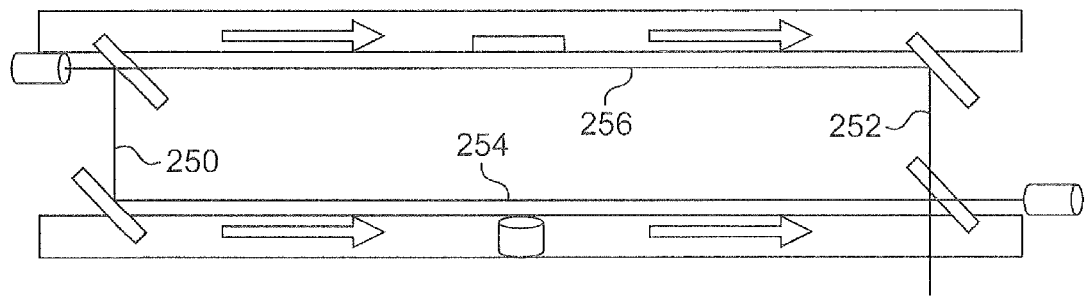
Figure 2C:
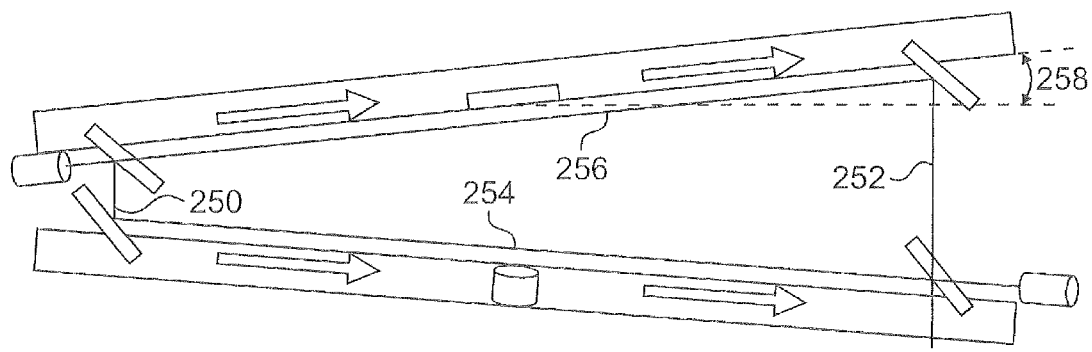

FIGS. 2A through 2C illustrate a first example flow meter 200 in accordance with this disclosure. The embodiment of the flow meter 200 shown in FIGS. 2A through 2C is for illustration only. Other embodiments of the flow meter 200 could be used without departing form the scope of this disclosure.

Figure 3:
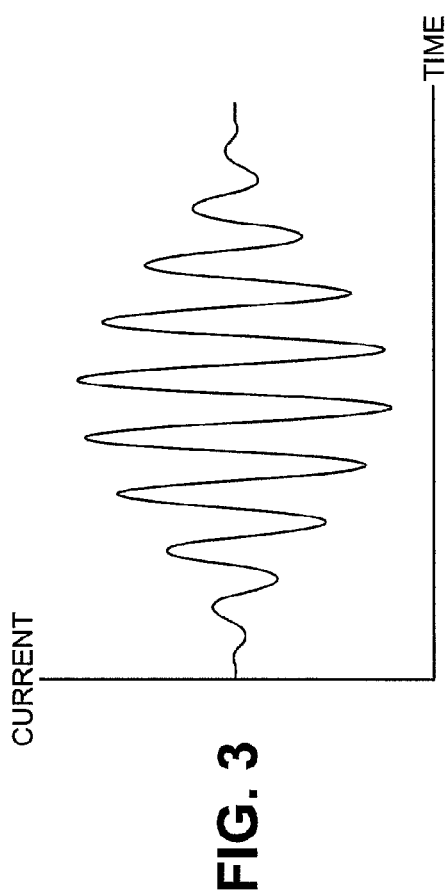
FIG. 3 illustrates an example excitation signal for a flow meter in accordance with this disclosure.

The flow meter 200 operates in the same manner described above. The flow meter 200 includes two flow tubes 202-204. Oscillations in the flow tubes 202-204 are induced using an exciter coil 206 and a magnet 208. The exciter coil 206 is located in or on the flow tube 204, and the magnet 208 is placed in or on the flow tube 202. The exciter coil 206 receives an excitation signal, a portion of which is illustrated in FIG. 3. The excitation signal is at or near the resonant frequency of the flow tubes 202-204 and can be provided by any suitable source. The excitation signal causes the exciter coil 206 to generate an electromagnetic field, which repeatedly attracts and repels the magnet 208 to create oscillating up and down movements in the flow tubes 202-204. The exciter coil 206 includes any suitable structure for generating electromagnetic forces. The magnet 208 represents any suitable magnetic substance or structure.

The exciter coil 206 and the magnet 208 produce the oscillating movement of the flow tubes 202-204, and material moving through the flow tubes 202-204 creates Coriolis-based deflection in the flow tubes 202-204. Since the deflection depends on the mass of material moving through the flow tubes 202-204, precise measurements of the movements of the tubes 202-204 can be made to determine the mass flow, volume flow, or other characteristic(s) of the material. In the flow meter 200, these measurements are taken using a Mach-Zender laser interferometer. In this example, the laser interferometer is formed using a laser diode 210, a photo-detector 212, and four mirrors 214-220. These components allow for precise measurements of the Coriolis effect produced by material flow through the flow tubes 202-204.

The laser diode 210 produces laser light or other coherent radiation. The radiation from the laser diode 210 is divided by the partial mirror 214, which could divide the radiation into two beams of approximately equal power. One of the beams is passed to the full mirror 216, which reflects the beam towards the partial mirror 220. The other beam is passed to the full mirror 218, which reflects the beam towards the partial mirror 220. The mirror 220 is arranged to combine a fraction of the light from each beam to be passed to the photo-detector 212. Depending on the path lengths of the two beams, the mirror 220 could pass none, some, or all of the radiation from the mirrors 216-218 towards the photo-detector 212. The photo-detector 212 then takes measurements of the radiation from the mirror 220 and outputs the measurements. The photo-detector 212 could, for example, generate and output intensity measurements of the received radiation. The outputs from the photo-detector 212 are further processed to identify the mass flow rate, volumetric flow rate, or other characteristic(s) of material flowing through the flow tubes 202-204.

The laser diode 210 includes any suitable structure for generating laser light or other coherent radiation, such as a laser light emitting diode for emitting directed coherent radiation. The photo-detector 212 includes any suitable structure for taking measurements of received radiation, such as a photodiode. Each of the mirrors 214-220 includes any suitable structure for at least partially reflecting laser light or other radiation. As particular examples, the mirrors 214 and 220 could represent partial mirrors with an ideal reflectivity of 50% (half mirrors), while the mirrors 216 and 218 could represent full mirrors with an ideal reflectivity of 100%.

The measurements from the photo-detector 212 in this example are provided to a processing unit 222, which processes the measurements to determine the mass flow rate, volumetric flow rate, or other characteristic(s) of material flowing through the flow tubes 202-204. The processing unit 222 could perform any suitable functions to determine the characteristic(s) of the material. Example calculations that could be performed by the processing unit 222 are provided below. The processing unit 222 could then output the calculated characteristic(s) of the material. The processing unit 222 includes any suitable processing or computing device, such as a microprocessor, processor, microcontroller, field programmable gate array, or digital signal processor.

A wireless radio 224 and an antenna 226 can be used to communicate wirelessly with other devices. For example, the wireless radio 224 and antenna 226 can be used to transmit information (such as determined mass or volumetric flow rates) to an external wireless router or other device for delivery to a specified destination (such as a process controller). The wireless radio 224 includes any suitable structure for generating signals for wireless transmission and possibly receiving signals transmitted wirelessly, such as a low-power radio frequency (RF) transmitter or transceiver. Also, the antenna 226 includes any suitable structure for transmitting and possibly receiving wireless signals, such as an RF antenna. It may be noted that any other suitable wireless signals could be used to communicate.

In addition, the flow meter 200 includes a power supply 228. The power supply 228 represents an internal or locally connected power supply that provides power to the components of the flow meter 200. The power supply 228 could represent any suitable source of power, such as a battery or a fuel cell. The power supply 228 could also represent an energy harvester that collects power based on, for example, environmental vibration, movement of material through the flow meter 200, or sunlight (such as a solar cell). Alternatively, the power supply 228 could be line powered in the cases of wire applications, such as when the flow meter 200 is physically wired to an external power source.

The following represents an explanation of the types of calculations that could be performed by the processing unit 222 to determine the characteristic(s) of the material traveling through the flow tubes 202-204. The following explanation also refers to FIGS. 2B and 2C, which illustrate the movement of the flow tubes 202-204 and the corresponding operation of the laser interferometer.

As shown in FIG. 2B, there are two paths between the laser diode 210 and the photo-detector 212. One path includes path 250 and path 254, and another path includes path 252 and path 256. Here, paths 254 and 256 are generally equal in length and remain so even during movement of the flow tubes 202-204. The paths 250 and 252 are equal in FIG. 2B but unequal in FIG. 2C. The lengths of these two paths 250 and 252 typically vary when material is flowing through the flow tubes 202-204.

The power of the laser diode 210 may be denoted $P_{ID}$, and the output power measured by the photo-detector 212 may be denoted $P_O$. The path length inclusive of paths 250 and 254 may be denoted as p1, and the path length inclusive of paths 256 and 252 may be denoted as p2. The output power $P_O$ could be expressed as:

$$P_O = \frac{1}{2} P_{ID}(1 + \sin(2\pi(p1 - p2)/\lambda)) \quad (1)$$

where λ represents the wavelength of the laser diode's output. As can be seen in Equation (1), changes in the lengths of the two paths p1 and p2 alter the output power measured by the photo-diode 212. Depending on the difference between the two paths, the sine term in Equation (1) can vary between −1 and 1, meaning the output power $P_O$ can vary between 0 and $P_{ID}$ (ideally).

As shown in FIG. 2C, each of the flow tubes 202-204 can experience twisting or other deflection, which produces a maximum deflection angle 258 from the flow tube's normal (non-twisting) position. The maximum deflection angle 258 can be denoted $\theta_M$ and varies based on the mass of material flowing through the flow tubes 202-204.

Given Equation (1) and the maximum deflection angle 258 in FIG. 2C, the following can be obtained:

$$p1 = l_1 + l_2 = l_1 - l_2 \sin(\theta_M) + l_2 = l_1 + l_2(1 - \sin(\theta_M)) \quad (2)$$

$$p2 = l_3 + l_2 = l_3 + l_2 \sin(\theta_M) + l_2 = l_3 + l_2(1 + \sin(\theta_M)). \quad (3)$$

Here, $l_1$ denotes the length of path 250, $l_2$ denotes the length of path 254 or 256, and $l_3$ denotes the length of path 252. If $l_1$ is equal to $l_3$, the following can be obtained:

$$p1 - p2 = -2l_2 \sin(\theta_M). \quad (4)$$

This can be used to rewrite Equation (1) as follows:

$$P_O = \frac{1}{2} P_{ID}(1 + \sin(4\pi l_2 \sin(\theta_M)/\lambda)). \quad (5)$$

If $l_1$ is not equal to $l_2$, there is a phase constant included in Equation (5) that can be ignored. $P_O$ varies sinusoidally as the path lengths vary, and each cycle of the sinusoid is referred to as a "fringe." If n is used to denote a fringe count (the number of cycles in the photo-detector output during a specified time), the following can be obtained for n fringes:

$$2\pi n = 4\pi l_2 \sin(\theta_M)/\lambda. \quad (6)$$

With Equation (6), the value of the maximum deflection angle 258 can be estimated as follows:

$$\sin(\theta_M) = n\lambda/2l_2, \text{ or} \quad (7)$$

$$\theta_M = n\lambda/2l_2 \text{ for small } \theta_M. \quad (8)$$

The governing equation of tube twisting is generally expressed as:

$$I_u \frac{d^2 \theta}{dt^2} + C_u \frac{d\theta}{dt} + K_u \theta = T. \quad (9)$$

Here, $I_u$ represents the twist inertia, $C_u$ represents the damping coefficient, $K_u$ represents the twist stiffness, $\theta$ represents the twist angle, T represents torque, and t represents time. When the torque T is generated by Coriolis force, the torque T can be expressed as:

$$T = T_c \cos \omega t \quad (10)$$

where $T_c$ represents the maximum torque from the Coriolis force, and $\omega$ represents the Coriolis force frequency (which equals the excitation frequency used to drive the flow tubes 202-204). The difference in the two path lengths during twisting of the flow tubes 202-204 can be expressed as:

$$(p1 - p2)\cos \omega t = -2l_2 \sin \theta_M \cos \omega t. \quad (11)$$

Assuming that damping is negligible, the maximum deflection angle 258 can be expressed as:

$$\theta_M = \frac{T_c}{K_u - I_u \omega^2}. \quad (12)$$

One traditional treatment to Equation (12) is to measure a time lag $\tau$ and to convert the time lag to a mass flow through the time lag relation to $\theta_M$ and the torque relation to mass flow. This can be done using the following equations:

$$Q_M = \frac{K_u\left[1 - \left(\frac{\omega}{\omega_u}\right)\right]}{2Kd^2} \tau \quad (13)$$

$$\omega_u = \sqrt{\frac{K_u}{I_u}}. \quad (14)$$

Here, $Q_M$ represents the mass flow rate, K represents a shape-dependent factor, d represents the width of the flow tubes, and $\omega_u$ represents the twist natural frequency. Moreover, the value of $T_c$ is also proportional to the mass flow through the flow tubes 202-204. As a result, the mass flow rate could be calculated as follows:

$$Q_M = k(K_u - I_u \omega^2)\theta_M = k_1(K_u - I_u \omega^2)n\lambda/l_2 \quad (15)$$

where k and $k_1$ are constants that depend on the flow meter 200.

Figure 4A:
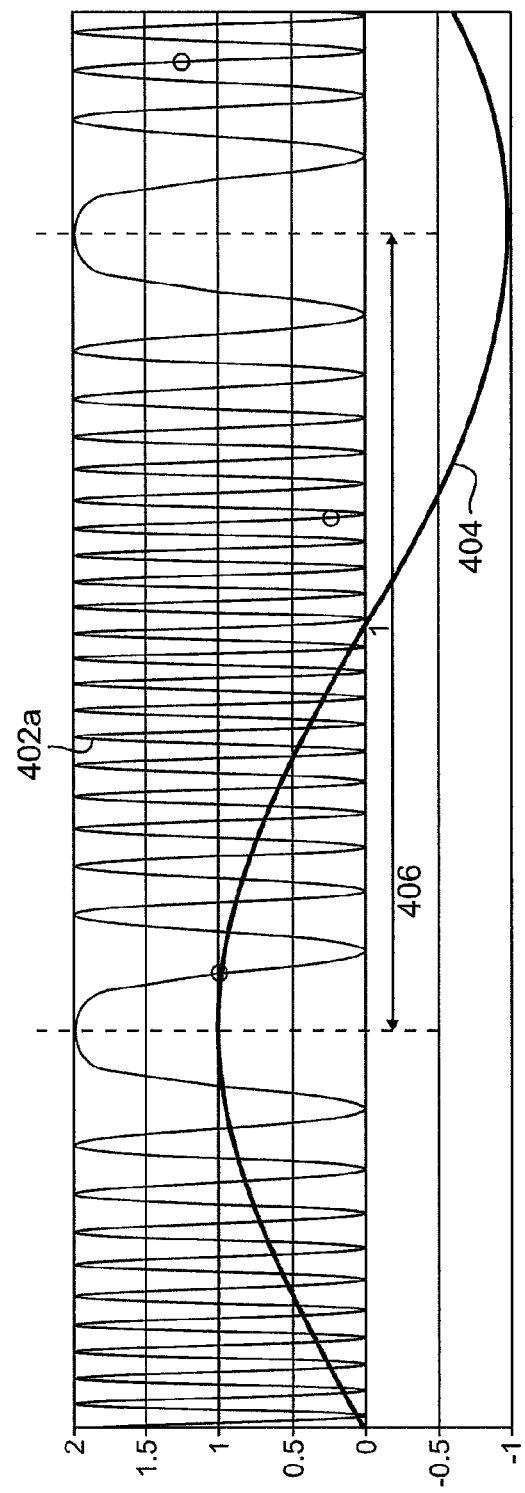
Figure 4D:
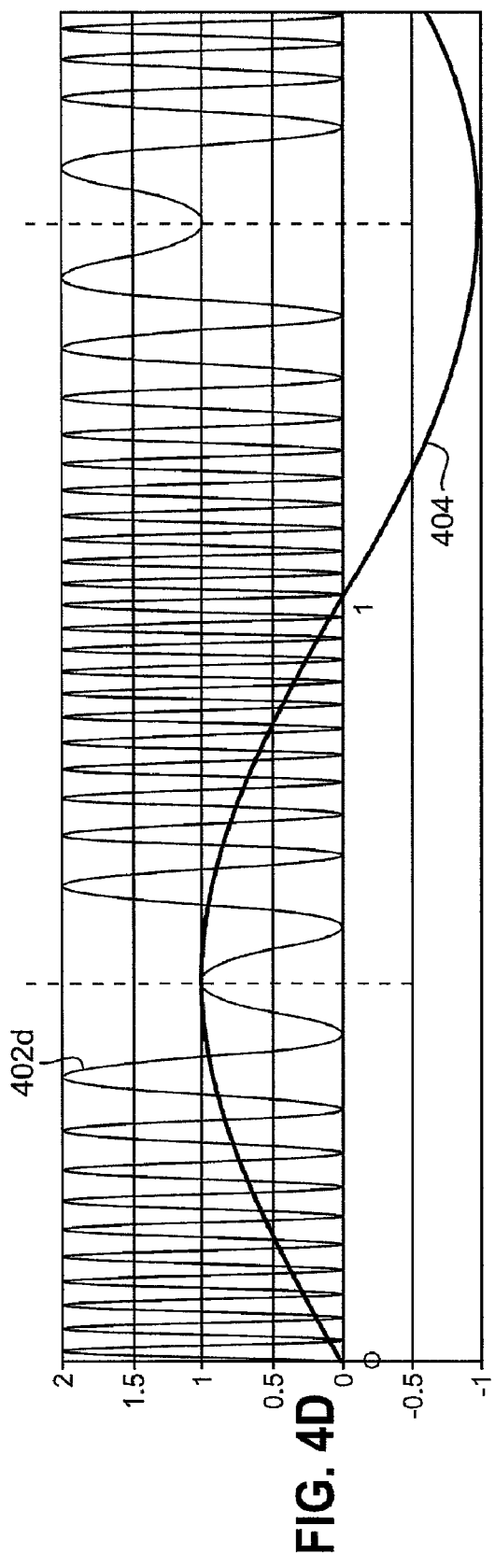

The output of the photo-detector 212 can be used to identify various values used in Equation (15), allowing the processing unit 222 to identify the mass flow rate $Q_M$. Example outputs of the photo-detector 212 are shown in FIGS. 4A through 4D, which illustrate that the output of the photo-detector 212 may vary depending on the initial path difference p1–p2. In FIG. 4A, line 402a represents the output of the photo-detector 212, while line 404 represents the Coriolis deflection angle $\theta_M$ of the flow tubes 202-204. Here, the output of the photo-detector 212 reflects a path difference of zero at the maximum Coriolis deflection. In FIG. 4B, line 402b represents the output of the photo-detector 212, where the path difference is $\lambda/2$ at the maximum Coriolis deflection. In FIG. 4C, line 402c represents the output of the photo-detector 212, where the path difference is $\lambda$ at the maximum Coriolis deflection. In FIG. 4D, line 402d represents the output of the photo-detector 212, where the path difference is $3\lambda/2$ at the maximum Coriolis deflection.

In these figures, the lines 402a-404d can be used by the flow meter 200 to determine the mass flow rate $Q_M$. More specifically, it is possible to use the output of the photo-detector 212 to determine the necessary values for computing the mass flow rate using Equation (15). The output of the photo-detector 212 varies as the Coriolis deflection changes the lengths of the two paths p1 and p2. As shown here, the lines 402a-402d generally have consistent periods or oscillations for most of the time, but the consistent periods or oscillations are interrupted occasionally. These interruptions are caused by a reversal in the direction of the Coriolis deflection. For example, in FIG. 4A, the time between interruptions in the signal 402a is denoted time 406. The length of this time 406 represents the period of the Coriolis deflection and can be used to determine the density of the material flowing through the flow tubes 202-204. The density of the material can then be used to calculate the twist inertia $I_u$.

The twist inertia $I_u$ can be defined as a function of the mechanical structure of the meter 200 and the material density. The mechanical structure of the meter 200 is known, and the material density can be defined as a function of the resonant frequency $1/T_{406}$ (where $T_{406}$ equals the time 406). Therefore, the time 406 can be measured and used to derive a value of the twist inertia $I_u$.

Moreover, the number of cycles in the output of the photo-detector 212 during the time 406 can be used to determine the deflection amplitude (the value of $\theta_M$). A single cycle generally represents one oscillation (one period) of the signal 402a, which also represents a path difference change of one radiation wavelength ($\lambda$). The number of cycles in the time 406 could be determined by counting the number of maximum or minimum peaks in the signal 402a during the time 406. The total number of cycles therefore represents the deflection amplitude $\theta_M$ measured in units of radiation wavelength. The total number of cycles is said to represent the number of fringes (denoted n above). As shown above in Equation (8), knowledge of the number of fringes n can be used to determine the value of $\theta_M$.

With the value of the twist inertia $I_u$ and the value of n (or $\theta_M$) determined, these values can be inserted into Equation (15) to calculate the mass flow rate through the flow meter 200. The processing unit 222 can therefore analyze the appropriate signal 402a-402d from the photo-detector 212 (depending on the phase), determine the time 406, determine the number of fringes n during that time 406, and derive the value of the twist inertia $I_u$. The processing unit 222 can then determine a value of the mass flow rate $Q_M$. Note that the processing unit 222 can be designed to recognize the various phases shown in FIGS. 4A through 4D and to analyze the signals 402a-402d accordingly. Also note that the processing unit 222 could determine other or additional characteristics of the flowing material. For instance, since the density of the flowing material is known, a volumetric flow rate can also be determined (such as by using the determined density and the determined mass flow rate).

The ability to measure Coriolis displacement with the accuracy of a fraction of a wavelength (using one or more laser interferometers) can enable low excitation amplitude, which requires extremely low excitation energy. Given an example geometry and assuming one measurement per second, only 7 μW of power may be needed to excite the flow tubes into an oscillation with a 14 μm amplitude, as given in the estimate tables below. Moreover, a low-power laser and photo-detector (such as 0.5 mW or below) can be enabled for a few Coriolis periods to take measurements of the Coriolis displacement, further reducing power consumption. This extremely low power consumption paves the way for a wireless Coriolis flow meter.

Environmental noises applied to the base of the two flow tubes 202-204 may generally induce in-phase vibrations of the two tubes. Induced common-mode light path variations can be automatically rejected by the laser interferometer(s), resulting in an improved insensitivity to vibrational noise. However, any asymmetry in the two tubes, flows, and induced noises could result in some vibration phase difference and interfere with the operation of the flow meter 200. Among other things, careful geometry design can limit the noise-induced vibration amplitude, such as to approximately 1 μm for 1 g noise peak acceleration around 100 Hz. This can be done, for instance, by choosing a tube natural resonant frequency far away from the noise peak frequencies.

The following provides data and calculations associated with magnitude estimates for one particular implementation of the flow meter 200. Table 1 provides various details regarding the particular implementation of the flow meter 200. All tables below serve as magnitude and trend estimates, not as a rigorous design.

TABLE 1

| Meter Characteristic | Value | Comments |
|---|---|---|
| Nominal flow rate | 4,800 kg/h or 1.333 kg/s | |
| Minimal flow rate | 0.013 kg/s | Assume 1% nominal |
| K (shape-dependent factor) | 1.0 | Assume perfect U-shaped flow tubes |
| Width of flow tubes | 0.05 m | |
| Length of flow tubes | 0.05 m | |

TABLE 1-continued

| Meter Characteristic | Value | Comments |
|---|---|---|
| Flow tube inner radius | 0.003 m | |
| Flow tube outer radius | 0.004 m | |
| Flow tube shell density | 1,520 kg/m$^3$ | Assume PVC |
| Material density | 1,000 kg/m$^3$ | Assume water |
| Flow tube inertia moment (vibration) | 1.285E−05 kg m$^2$ | Vibrates around anchor |
| Flow tube inertia moment (twist) | 2.651E−06 kg m$^2$ | Twists around center point and anchor |
| Flow tube shell elastic module | 2.90E+09 Pa | Assume PVC |
| Possion ratio | 0.3 | |
| Shear modulus | 1.12E+09 Pa | |
| Flow tube oscillation stiffness | 8.71E+01 N m | |
| Flow tube natural oscillation frequency | 414.38 Hz | U-tube oscillation |
| Flow tube twist frequency | 414.38 Hz | Coriolis force follows tube oscillation |
| Flow tube twist stiffness | 61.62 N m | |
| Flow tube twist natural frequency | 767.3 Hz | |

The flow meter 200 may be used in environments that suffer from background or other external vibrations. These external vibrations act as noise in the measurements taken by the flow meter 200. Table 2 provides various examples of external vibrations and the worst-case acceleration and frequency of those external vibrations

TABLE 2

| Vibration Source | Acceleration (m/s$^2$) | Peak Frequency (Hz) |
|---|---|---|
| Car engine compartment | 12 | 200 |
| Base of 3-axis machine tool | 10 | 70 |
| Blender casing | 6.4 | 121 |
| Clothes dryer | 3.5 | 121 |
| Person tapping heel of shoe | 3 | 1 |
| Car instrument panel | 3 | 13 |
| Door frame (just after closing door) | 3 | 125 |
| Small microwave oven | 2.5 | 121 |
| HVAC vents in office building | 0.2-1.5 | 60 |
| Window next to busy road | 0.7 | 100 |
| CD on notebook computer | 0.6 | 75 |
| Second story floor of busy office | 0.2 | 100 |

Assume that the flow meter 200 is used with a three-axis machine tool. In this example, the noise experienced by the flow meter 200 could be determined as shown in Table 3.

TABLE 3

| Noise Characteristic | Value | Comments |
|---|---|---|
| Noise acceleration | 10 m/s$^2$ | Maximum (worst case) |
| Noise peak frequency | 100 Hz | |
| Torque amplitude from noise acceleration | 0.00231 N m | Integrate the force over the U-tube geometry for torque |
| Noise (harmonic) amplitude | 1.41 μm | Noise amplitude at noise frequency. Noise effect would be smaller than this due to common mode rejection of flow tubes, shock prevention, and noise isolation |

TABLE 3-continued

| Noise Characteristic | Value | Comments |
|---|---|---|
| Minimum twist amplitude needed | 14.1 μm | Assume 10X larger than maximum noise effect |
| Minimum vibration amplitude needed | 14.1 μm | Assume 10X larger than maximum noise effect |

The last two rows in Table 3 identify the minimum vibration (oscillation) and twist amplitudes needed to overcome any noise that might affect the flow meter 200 in the worst case.

Table 4 provides energy calculations associated with operation of the flow meter 200, given these minimum vibration (oscillation) and twist amplitudes.

TABLE 4

| Energy Characteristic | Value | Comments |
|---|---|---|
| Minimum mechanical energy needed | 3.464E−06 J | Minimum energy for excitation to minimum actuation amplitude |
| Mechanical efficiency | 0.5 | Assumed value |
| Assumed measurement cycle | 1 s | |
| Average mechanical power | 6.927 μW | Minimum power needed for vibration |

Table 5 provides calculations of flow rate and twist amplitude and desired twist frequency in an improved design associated with operation of the flow meter 200.

TABLE 5

| Flow Rate/Twist Characteristic | Value | Comments |
|---|---|---|
| Set time lag | 1.207E−05 s | Assume phase difference~π × 0.01 |
| Mass flow rate corresponding to time lag | 0.105 kg/s | |
| Time lag for minimal flow rate | 0.000153 s | Minimal time resolution needed |
| Coriolis acceleration amplitude | 0.692 m/s$^2$ | For minimum flow |
| Corresponding twist angle for Coriolis acceleration amplitude | 5.607E−07 arc or 3.212E−05 degrees | For minimum flow |
| Corresponding twist amplitude for Coriolis acceleration amplitude | 6.268E−09 m | Need to improve twist amplitude at minimum flow, such as by resonance. |
| Desired twist amplitude | 1 μm | Dives 4X (4 μm) light path difference in one detector configuration |
| Desired frequency ratio of tube oscillation vs. tube twist | 0.998 | Assumes same stiffness |
| Twist frequency needed for design | 415.3 Hz | Another choice is to drive tube at twist natural frequency |

Table 6 provides laser calculations associated with operation of the flow meter 200 given the above values.

TABLE 6

| Laser Characteristic | Value | Comments |
|---|---|---|
| Laser power | 0.6 mW | |
| Assumed laser on-time | 0.0241 s | |
| Number of lasers | 1 | Could be 635 nm 0.6 mW variable focus laser from Coherent Auburn Group - Instrument Division |
| Average laser power | 0.0145 mW | Assume 10 cycles |

Tables 1 through 6 above provide estimated details of a specific implementation of the flow meter 200. The characteristics of the flow meter 200 are provided in Table 1, and Tables 2 and 3 provide details for calculating the noise effects in that flow meter 200. Table 4 provides details for overcoming the noise effects in the flow meter 200 (by establishing a floor below which measurements should not be taken). Table 5 provides details for calculating certain vibration and twist characteristics of the flow meter 200, and Table 6 provides details regarding the power of the laser needed in the flow meter 200.

In these embodiments, low-power lasers or other sources can be used to take the angular displacement measurements, and these measurements can be very precise. As a particular example, the laser interferometer could be able to measure deflections as small as 10% of a specified wavelength, such as deflections as small as approximately 50 nm. Also, because the angular displacement measurements can be very precise, the amount of energy needed to excite the flow tubes 202-204 can be reduced or minimized. For example, a mass or volumetric flow measurement could be initiated with a very short excitation pulse to cause the flow tubes 202-204 to begin an exponential vibration decay. Further, the lasers or other sources can only be turned on when the angular displacement measurements are taken, and the laser "on-time" can be reduced to only a few cycles of mechanical resonance. In addition, the flow meter 200 could enter a sleep state between measurements, such as a deep sleep state where only a background clock runs (in order to wake the meter 200 at the next measurement time). Beyond that, other low-power components, such as a low-power wireless radio 224, could be used in the flow meter 200. For these reasons, the energy consumption of the flow meter 200 may be very low.

Figure 5:
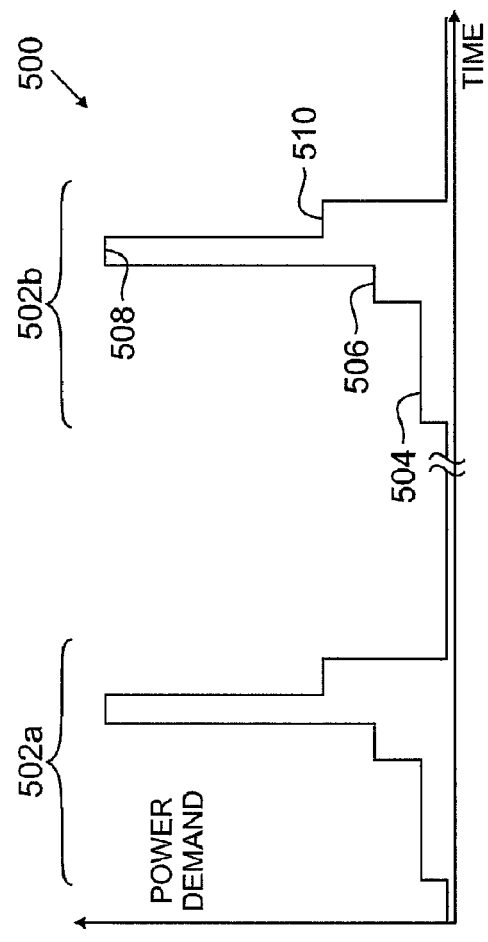
FIG. 5 illustrates example power usage in a flow meter in accordance with this disclosure.

The energy consumption of one example implementation of the flow meter 200 is shown in FIG. 5. Here, a power profile 500 for the flow meter 200 indicates that the power demand for the flow meter 200 is generally low except during times 502a-502b when measurements are actually occurring. During each of these times 502a-502b, the profile 500 includes a relatively low power demand 504 when the flow tubes 202-204 are being excited, followed by a slightly higher power demand 506 when the angular deflection of the flow tubes 202-204 is being measured and the mass flow rate, volumetric flow rate, or other characteristic(s) are being calculated. This is followed by a relatively high power demand 508 when the flow meter 200 is wirelessly transmitting the characteristic value(s). Optionally, this could be followed by a lower power demand 510 when the flow meter 200 awaits an acknowledgement message from an external component (showing that the transmitted data was received). This duty-cycled operation may allow the flow meter 200 to provide measurements using very low power, allowing the flow meter 200 to operate using its internal power supply 228 for a very lengthy period of time (possibly its entire operational life).

Although FIGS. 2A through 2C illustrate a first example flow meter 200 and FIGS. 3 through 5 illustrate example details of its operation, various changes may be made to FIGS. 2A through 5. For example, various components in the flow meter 200 could be combined or further subdivided, such as when the wireless radio 224 is incorporated into the processing unit 222. Also, the flow tubes 202-204 could have any suitable shape, such as a perfect U-shape. Further, while described as measuring twist, the same or similar technique could be used to measure any suitable Coriolis-based deflection. In addition, note that material could flow through only one of the flow tubes 202-204, so only one of the flow tubes may experience deflection.

Figure 6A:
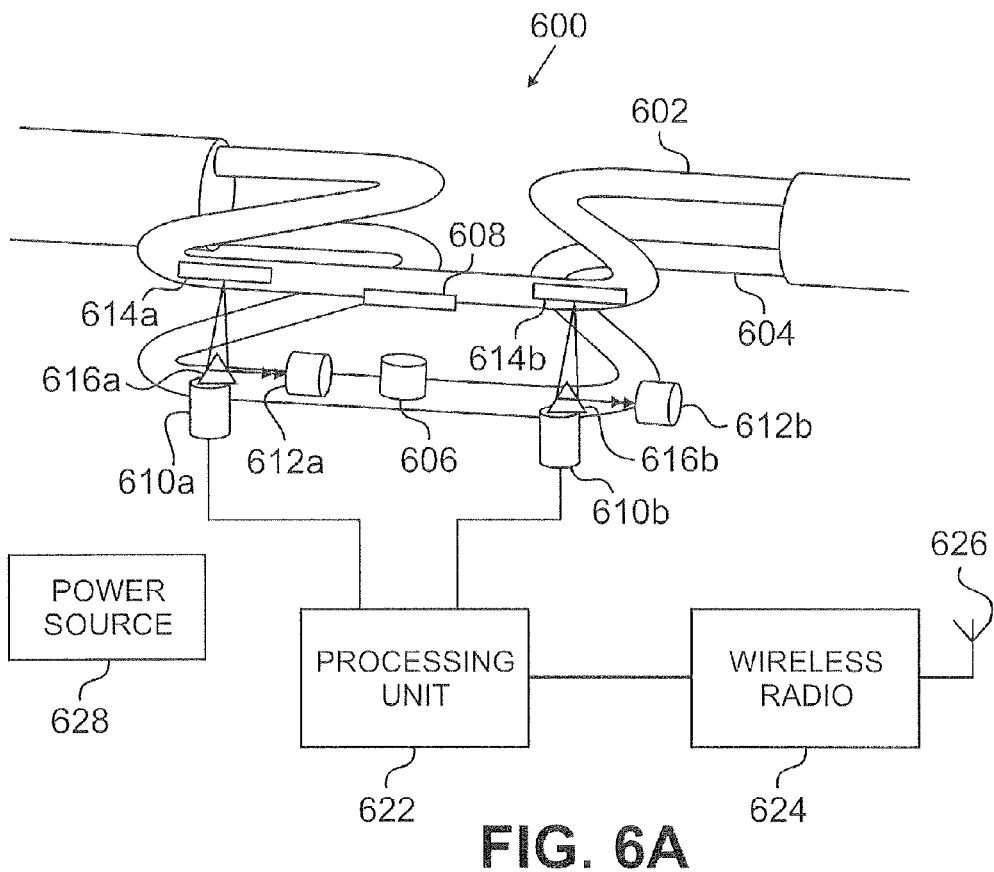
FIGS. 6A and 6B illustrate a second example flow meter in accordance with this disclosure.
Figure 6B:
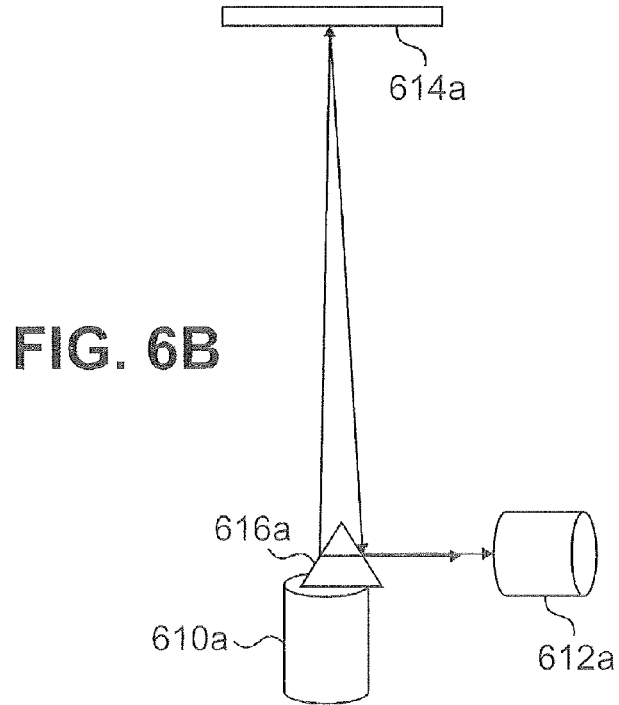

FIGS. 6A and 6B illustrate a second example flow meter 600 in accordance with this disclosure. The embodiment of the flow meter 600 shown in FIGS. 6A and 6B is for illustration only. Other embodiments of the flow meter 600 could be used without departing from the scope of this disclosure.

The flow meter 600 operates in a similar manner as the flow meter 200. In this example, two flow tubes 602-604 are excited using an exciter coil 606 and a magnet 608. The flow meter 600 uses two laser interferometers to measure the angular displacement between the flow tubes 602-604 in this embodiment. One laser interferometer includes a laser diode 610a, a photo-detector 612a, a first full mirror 614a, and two partial mirrors 616a. The other laser interferometer similarly includes a laser diode 610b, a photo-detector 612b, a first full mirror 614b, and two partial mirrors 616b (such as half mirrors). Each of these components may be the same as or similar to corresponding components in the flow meter 200.

The operation of these laser interferometers is illustrated in FIG. 6B. The laser diode 612a generates a laser light beam or other radiation. The beam is split by one of the partial mirrors 616a, which reflects part of the beam towards the photo-detector 612a and allows the other part of the beam to pass to the mirror 614a. The mirror 614a reflects that part of the beam back to another of the partial mirrors 616a, which could deflect none, some, or all of that radiation towards the photo-detector 612a. The radiation from the mirror 614a that is deflected towards the photo-detector 612a depends on the path taken by the radiation from the laser diode 610a to the mirror 614a. As a result, measurements taken by the photo-detector 612a can be used to identify the separation of the two flow tubes 602-604.

The outputs of the photo-detectors 612a-612b are provided to a processing unit 622 for processing. The processing unit 622 could, for example, use the outputs of the photo-detectors 612a-612b to determine the distance measured by each of the laser interferometers. These distances can be used to determine the angular displacement of the flow tubes 602-604. The processing unit 622 could also use these measurements to identify the twist inertia $I_u$ of the flow tubes 602-604. Using this information, the processing unit 622 can calculate the mass flow rate, volumetric flow rate, or other characteristic(s) of material through the flow tubes 602-604.

The calculated characteristic value(s) could be provided to a wireless radio 624 for transmission via an antenna 626, and various components in the flow meter 600 are powered by a power source 628. These components 622-628 may be the same as or similar to the corresponding components in the flow meter 200 (although the calculations performed by the processing unit 622 can differ).

Although FIGS. 6A and 6B illustrate a second example flow meter 600, various changes may be made to FIGS. 6A and 6B. For example, various components in the flow meter 600 could be combined or further subdivided, such as when the wireless radio 624 is incorporated into the processing unit 622. Also, the flow tubes 602-604 could have any suitable shape, such as a perfect U-shape. Further, while described as measuring twist, the same or similar technique could be used to measure any suitable Coriolis-based deflection. In addition, note that material could flow through only one of the flow tubes 602-604, so only one of the flow tubes may experience deflection.

Figure 7:
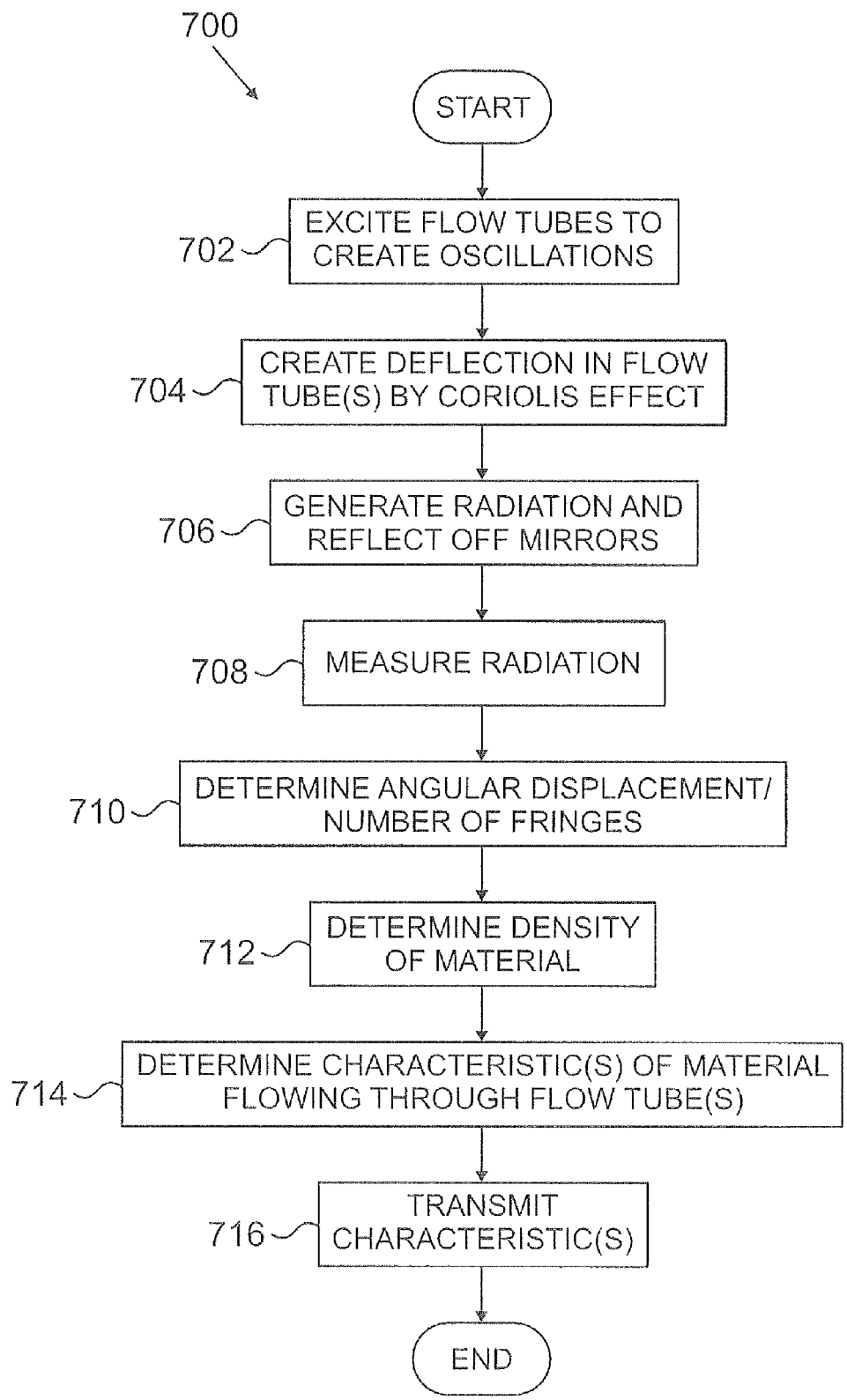
FIG. 7 illustrates an example method for flow sensing in accordance with this disclosure.

FIG. 7 illustrates an example method 700 for flow sensing in accordance with this disclosure. The embodiment of the method 700 shown in FIG. 7 is for illustration only. Other embodiments of the method 700 could be used without departing from the scope of this disclosure. Also, while the method 700 is described with respect to the flow meter 200 of FIGS. 2A through 2C, the same or similar method could be used by the flow meter 600 or any other suitable meter.

Flow tubes of a flow meter are excited to create oscillations at step 702. This could include, for example, providing an excitation signal to the exciter coil 206 of the flow meter 200. This may also include the exciter coil 206 generating an electromagnetic field that attracts and repels a magnet 208. This creates oscillating movement in the flow tubes 202-204 of the flow meter 200.

The Coriolis effect creates twist or other deflection in the flow tube(s) at step 704. This could include, for example, material flowing through the tubes creating the Coriolis effect, which causes the flow tubes 202-204 to twist in opposing or counter directions. This may also create an angular displacement in each of the flow tubes 202-204 (compared to the normal non-twisting positions of the flow tubes). A maximum angular displacement depends on the mass of material flowing through the flow tubes 202-204.

Radiation is generated and reflected off one or more mirrors attached to the flow tubes at step 706. This could include, for example, generating a laser beam using the laser diode 210, splitting the beam using the mirror 214, and reflecting the beams off the mirrors 216-218. None, some, or all of the radiation from the mirrors 216-218 is then deflected by the mirror 220 to the photo-detector 212. The mirrors here function to mix radiation from a source (the laser diode 210) that has traveled two separate paths to enable interferometric measurements. The radiation is measured at step 708. This could include, for example, the photo-detector 212 measuring the laser light reflected from the mirror 220.

An angular displacement or a number of fringes is determined at step 710. This could include, for example, the processing unit 222 identifying one of the phases shown in FIGS. 4A through 4D and identifying a time 406 for a single period of the Coriolis deflection using the appropriate phase. This may also include the processing unit 222 counting the number of oscillations in the output of the photo-detector 212 during that time 406. This may further include the processing unit 222 calculating a value of the angular displacement $\theta_M$ as being approximately equal to $n\lambda/2l_2$.

A density of the material flowing through the flow tubes is determined at step 712. This could include, for example, the processing unit 222 using the length of the time 406 to determine the density of the material.

One or more characteristics of the material flowing through the flow tubes is determined at step 714. This could include, for example, the processing unit 212 using Equation (15) above and the determined values of the fringe count or the angular displacement and the material density. One or more values of the one or more characteristics are then transmitted at step 716. This may include, for example, the processing unit 222 providing a determined flow rate value or other characteristic value to the wireless radio 224 for transmission. In the end, the flow meter may then go into sleep mode until the next flow measurement.

Although FIG. 7 illustrates an example method 700 for flow sensing, various changes may be made to FIG. 7. For example, while shown as a series of steps, various steps in FIG. 7 may overlap, occur in parallel, occur multiple times, or occur in a different order.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "up," "down," "left," "right," and the like refer to relative positions or directions in the figures and are not meant to denote limitations during manufacture or use of a device. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
creating Coriolis-based deflections in two oscillating flow tubes of a flow meter, the Coriolis-based deflections caused by material flowing through the flow tubes;
taking interferometric measurements of the flow tubes using a laser interferometer, the laser interferometer comprising multiple arms, wherein the deflections affect paths of the arms of the laser interferometer;
determining an amplitude and a period of the deflections using the interferometric measurements;
determining a characteristic of the material using the amplitude and the period of the deflection; and
transmitting the characteristic from the flow meter.

2. The method of claim 1, wherein the laser interferometer comprises a Mach-Zend laser interferometer.

3. The method of claim 2, wherein:
the two flow tubes are symmetrical to each Other;
the flow tubes are excited into oscillations in opposite directions to create the Coriolis-based deflection; and
further comprising rejecting at least some common-mode noise caused by environmental vibrations of the flow meter using the laser interferometer.

4. The method of claim 2, wherein:
the laser interferometer comprises a photo-detector;
determining the period of the deflection comprises identifying one period of the deflection based on variations in a period of fringes in an output of the photo-detector; and
determining the amplitude of the deflection comprises determining a number of fringes in the output of the photo-detector during the one period of the deflection.

5. The method of claim 4, wherein determining the characteristic comprises:
determining a resonant frequency of the flow, tubes using the one period of the deflection; and
determining a density of the material using the resonant frequency.

6. The method of claim 1, wherein determining the characteristic comprises determining a mass or volumetric flow rate of the material.

7. The method of claim 1, further comprising:
placing the flow meter in a reduced power sleep state between two determinations of the characteristic.

8. The method of claim 7, wherein creating the Coriolis-based deflection comprises applying an excitation signal to an actuator when the flow meter exits the reduced power sleep state to incite the at least one flow tubes into oscillation.

9. The method of claim 1, wherein transmitting the characteristic comprises wirelessly transmitting the characteristic.

10. An apparatus comprising:
a laser interferometer configured to generate and output interferometric measurements associated with two oscillating flow tubes, the flow tubes configured to receive flowing material that creates Coriolis-based deflection in the flow tubes; and
a processing unit configured to determine an amplitude and a period of the deflection using the interferometric measurements and to determine a characteristic of the material using the amplitude and the period of the deflection.

11. The apparatus of claim 10, wherein the laser interferometer comprises:
a first partial mirror configured to direct a first part of radiation along a first path associated with a first flow tube and to direct a second part of the radiation along a second path associated with a second flow tube;
mirrors configured to direct the radiation traveling along the first and second paths to a second partial mirror, the second partial mirror configured to combine part of the radiation from the first path and part of the radiation from the second path; and
a radiation detector configured to receive the combined radiation from the second partial mirror.

12. The apparatus of claim 10, wherein the laser interferometer comprises one of multiple laser interferometers, the laser interferometers positioned to measure distances between multiple flow tubes at different points.

13. The apparatus of claim 10, wherein:
the laser interferometer comprises a photo-detector;
the processing unit is configured to determine the period of the deflection by identifying one period of the deflection based on variations in a period of fringes in an output of the photo-detector; and
the processing unit is configured to determine the amplitude of the deflection by determining a number of fringes in the output of the photo-detector during the one period of the deflection.

14. The apparatus of claim 13, wherein the processing unit is configured to determine the characteristic by:
determining a resonant frequency of the flow tubes using the one period of the deflection; and
determining a density of the material using the resonant frequency.

15. The apparatus of claim 10, wherein:
the laser interferometer comprises a Mach-Zender laser interferometer;
the flow tubes are symmetrical to each other;
the flow tubes are excited into oscillations in opposite directions to create the Coriolis-based deflection; and
measurements by the Mach-Zender interferometer reject at least some common-mode noise caused by environmental vibrations of the apparatus.

16. The apparatus of claim 10, further comprising:
a wireless radio configured to wirelessly transmit the characteristic.

17. The apparatus of claim 10, further comprising:
an actuator configured to receive an excitation signal and to incite the flow tubes into oscillation.

18. A non-transitory computer readable medium embodying a computer program, the computer program comprising:
computer readable program code for receiving interferometric measurements associated with two oscillating flow tubes of a flow meter, the flow tubes configured to undergo Coriolis-based deflection caused by material flowing through the flow tubes;
computer readable program code for determining an amplitude and a period of the deflection using the interferometric measurements;
computer readable program code for determining a characteristic of the material using the amplitude and the period of the deflection; and
computer readable program code for outputting the characteristic.

19. The non-transitory computer readable medium of claim 18, wherein:
the computer readable program code for determining the amplitude and the period of the deflection comprises:
computer readable program code for identifying one period of the deflection based on variations in a period of fringes in the interferometric measurements; and
computer readable program code for determining a number of fringes during the one period of the deflection; and
the computer readable program code for determining the characteristic of the material comprises:
computer readable program code for determining a resonant frequency of the at least ene flow tubes using the one period of the deflection; and
computer readable program code for determining a density of the material using the resonant frequency.

20. A method comprising:
creating Coriolis-based deflection in at least one oscillating flow tube of a flow meter, the Coriolis-based deflection caused by material flowing through the at least one flow tube;
determining an amplitude and a period of the deflection using interferometric measurements of the at least one flow tube;
determining a characteristic of the material using the amplitude and the period of the deflection;
transmitting the characteristic from the flow meter; and
placing the flow meter in a reduced power sleep state between two determinations of the characteristic.

21. The method of claim 20, wherein creating the Coriolis-based deflection comprises applying an excitation signal to an actuator when the flow meter exits the reduced power sleep state to incite the at least one flow tube into oscillation.

* * * * *